United States Patent
Ghosh et al.

(10) Patent No.: US 11,720,113 B2
(45) Date of Patent: Aug. 8, 2023

(54) VEHICLE CONTROL AND TRIP PLANNING SYSTEM

(71) Applicant: Westinghouse Air Brake Technologies Corporation, Wilmerding, PA (US)

(72) Inventors: Dipankar Ghosh, Melbourne, FL (US); James Glen Corry, Satellite Beach, FL (US); William Cherrick Schoonmaker, Melbourne, FL (US); Mark Bradshaw Kraeling, Melbourne, FL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 701 days.

(21) Appl. No.: 16/719,165

(22) Filed: Dec. 18, 2019

(65) Prior Publication Data

US 2021/0191410 A1 Jun. 24, 2021

(51) Int. Cl.
*G05D 1/02* (2020.01)
*B61L 3/08* (2006.01)
*B61L 23/00* (2006.01)
*G05D 1/00* (2006.01)
*B60T 8/172* (2006.01)

(52) U.S. Cl.
CPC ............ *G05D 1/0221* (2013.01); *B60T 8/172* (2013.01); *B61L 3/08* (2013.01); *B61L 23/00* (2013.01); *G05D 1/0061* (2013.01); *G05D 1/0088* (2013.01); *G05D 1/0274* (2013.01)

(58) Field of Classification Search
CPC .. G05D 1/0221; G05D 1/0061; G05D 1/0088; G05D 1/0274; B60T 8/172; B61L 3/08; B61L 23/00
See application file for complete search history.

(56) References Cited

U.S. PATENT DOCUMENTS 6,996,461 B2 7/2006 Kane
7,236,860 B2 6/2007 Kane
(Continued)

FOREIGN PATENT DOCUMENTS

KR 1020170133149 A 12/2017

OTHER PUBLICATIONS de Souza, V. et al., 'A Case Study Approach to Automatic Driving Train using CBR with Differential Evolution', 2018 IEEE International Conference on Systems, Man, and Cybernetics, IEEE, 2018, pp. 3631-3636, doi: 10.1109/SMC.2018.00614.
(Continued)

*Primary Examiner* — Ramsey Refai
(74) *Attorney, Agent, or Firm* — The Small Patent Law Group LLC; Mary D. Lawlor

(57) ABSTRACT

A vehicle control system and method includes identifying a segment of a route where one or more first vehicle systems were operated manually instead of operated by one or more processors according to one or more trip plans during prior traversals of the segment by the one or more first vehicle systems. A segment plan is generated for traversing the segment under control of the one or more processors. The segment plan is generated based on how the one or more first vehicle systems were manually operated during the prior traversals of the segment. One or more second vehicle systems are controlled with the one or more processors to traverse the segment according to the segment plan.

20 Claims, 3 Drawing Sheets

(56) References Cited

U.S. PATENT DOCUMENTS

| | | |
|---|---|---|
| 7,467,032 B2 | 12/2008 | Kane |
| 7,742,850 B2 | 6/2010 | Kane |
| 8,630,757 B2 | 1/2014 | Daum et al. |
| 8,714,494 B2 | 5/2014 | Weber |
| 9,002,545 B2 | 7/2015 | Wilson |
| 9,168,936 B2 | 10/2015 | Grimm |
| 9,233,698 B2 | 1/2016 | Weber |
| 9,283,945 B1 | 3/2016 | Kernwein |
| 9,460,566 B2 | 4/2016 | Allwardt |
| 9,469,310 B2 | 10/2016 | Kernwein |
| 9,651,947 B2 * | 5/2017 | Kim ................. B60W 50/082 |
| 9,846,025 B2 | 12/2017 | Kirchner |
| 9,950,718 B2 | 4/2018 | Naylor |
| 10,077,033 B2 | 9/2018 | Oswald |
| 10,081,378 B2 | 9/2018 | Ruhland |
| 2005/0273215 A1* | 12/2005 | Kuge ................. B60T 8/17551 701/1 |
| 2009/0105920 A1 | 5/2009 | Fenske |
| 2013/0171590 A1 | 7/2013 | Kumar |
| 2014/0018993 A1* | 1/2014 | Kindo ............... B60W 60/0053 701/23 |
| 2016/0075356 A1 | 3/2016 | Kull |
| 2016/0252903 A1* | 9/2016 | Prokhorov ............. G05D 1/021 701/23 |
| 2017/0043797 A1 | 2/2017 | Allshouse |
| 2017/0108870 A1* | 4/2017 | Miller ................. G05D 1/0223 |
| 2018/0164808 A1* | 6/2018 | Prokhorov ........... G05D 1/0061 |
| 2019/0163176 A1* | 5/2019 | Wang .................... G05D 1/0027 |
| 2020/0310450 A1* | 10/2020 | Reschka ............ B60W 60/0011 |

OTHER PUBLICATIONS

Liu, T. et al., 'Reinforcement Learning-Based Predictive Control for Autonomous Electrified Vehicles', 2018 IEEE Intelligent Vehicles Symposium (IV), IEEE, 2018, pp. 185-190, doi: 10.1109/IVS.2018.8500719.

Lu, C. et al., 'A Personalized Behavior Learning System for Human-Like Longitudinal Speed Control of Autonomous Vehicles', Sensors 2019, Aug. 2019, 3672, doi:10.3390/s19173672.

Examination Report dated Jul. 27, 2021 for corresponding Australian Application No. 2020289782 (6 Pages).

Examination Report dated Oct. 29, 2021 for corresponding Australian Application No. 2020289782 (6 Pages).

Notice of a Requisition for corresponding CA Application No. 3,101,956 dated Feb. 8, 2023 (6 pages).

* cited by examiner

VEHICLE CONTROL AND TRIP PLANNING SYSTEM

BACKGROUND

Technical Field

The subject matter described relates to vehicle control systems and methods.

Discussion of Art

Some vehicle systems operate under automatic control to optimize plural factors such as fuel consumption, emissions production, arrival deadlines, or the like. System controllers may calculate an optimal speed profile and automatically operate the vehicle system as the vehicle system moves along the route. The optimal speed profile may include different throttle settings and brake settings to automatically control the vehicle system as the vehicle system moves along the route.

However, at one or more times, the vehicle system may be manually controlled instead of automatically controlled. For example, within certain regions, such as areas having an increase in vehicle and/or pedestrian congested, the speed of the vehicle system may need to be reduced. An operator of the vehicle system may manually control operation of the vehicle system to manually control the throttle setting or brake setting of the vehicle, and therefore the vehicle system may deviate from traveling according to the optimal speed profile. This can pose a risk to the operator having to manually control the vehicle system, may cause the vehicle system to violate a limit, may cause a delayed arrive of the vehicle system to the destination, or the like.

BRIEF DESCRIPTION

In one or more embodiments, a method includes identifying a segment of a route where one or more first vehicle systems were operated manually instead of operated by one or more processors according to one or more trip plans during prior traversals of the segment by the one or more first vehicle systems. A segment plan is generated for traversing the segment under control of the one or more processors. The segment plan is generated based on how the one or more first vehicle systems were manually operated during the prior traversals of the segment. One or more second vehicle systems are controlled with the one or more processors to traverse the segment according to the segment plan.

In one or more embodiments, a vehicle control system includes a controller that identifies a segment of a route where one or more first vehicle systems were operated manually instead of operated by one or more processors according to one or more trip plans during prior traversals of the segment by the one or more first vehicle systems. The controller generates a segment plan for traversing the segment under control of the one or more processors. The segment plan may be generated based on how the one or more first vehicle systems were manually operated during the prior traversals of the segment. The controller controls one or more second vehicle systems to traverse the segment according to the segment plan.

In one or more embodiments, a method includes identifying a segment of a route where one or more first vehicle systems were operated manually instead of operated by one or more processors onboard the one or more first vehicle systems according to one or more trip plans during prior traversals of the segment by the one or more first vehicle systems. A machine-learned trip plan is generated for traversing the segment under control of the one or more processors. The machine-learned trip plan may be generated based on how the one or more first vehicle systems were manually operated during the prior traversals of the segment. A portion of the one or more trip plans where the one or more first vehicle systems were operated manually instead of operated by the one or more processors is replaced with the machine-learned trip plan. The one or more second vehicle systems are controlled with the one or more processors onboard the one or more second vehicle systems to traverse the segment according to the machine-learned trip plan.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
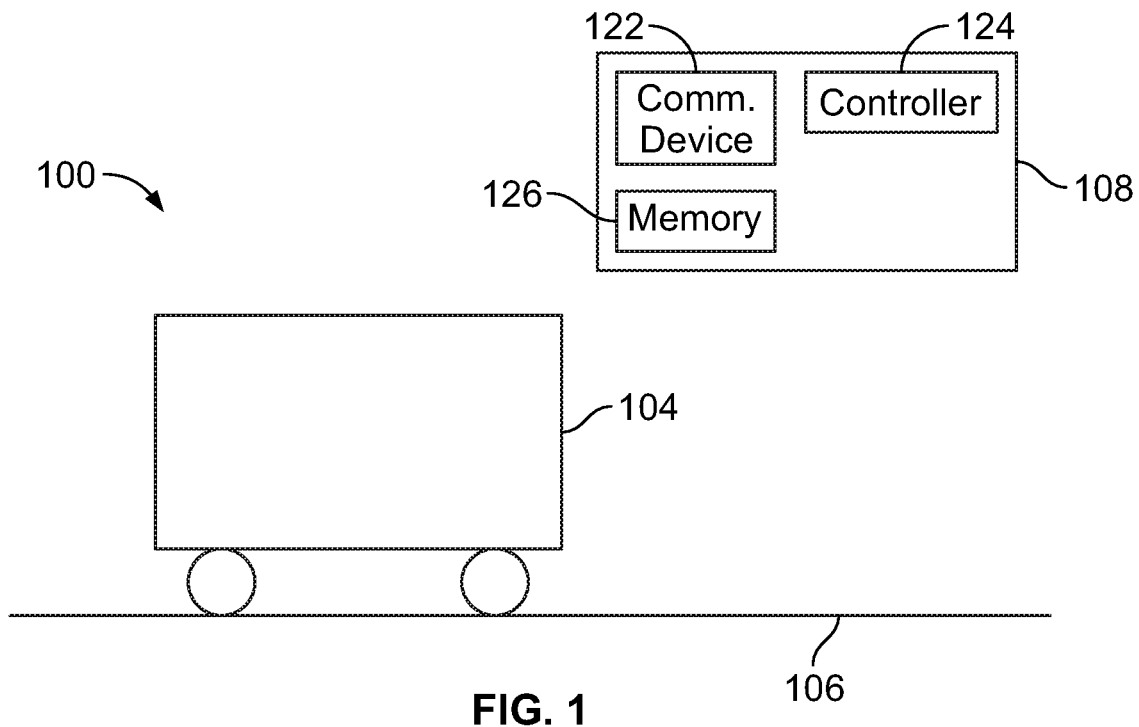
FIG. 1 schematically illustrates one example of a vehicle control system.

Embodiments of the subject matter described herein relate to vehicle control systems and methods for controlling vehicle systems with processors. The vehicle systems may be controlled to move along a route according to a trip plan. The trip plan may include at least a set of instructions that include propulsion system settings and/or navigational settings that function to propel a vehicle in a certain way at a certain location, and/or at a certain time. The navigation may be time-based, location and/or GPS based, or may use beacons or other visual data to determine which instructions should be executed and when. The vehicle systems may be controlled according to the trip plan by one or more processors onboard the vehicle systems, by a controller or back-office server off-board the vehicle system, by an electronic device irrespective of a location of the device, or the like. For example, the vehicle systems may be operated by one or more processors instead of an operator or person.

For one or more reasons, the vehicle systems may be operated manually for example by the operator onboard and/or off-board the vehicle systems, instead of by the processors at one or more locations along the route. For example, the operator may manually change one or more operational settings of the vehicle systems that may deviate from the one or more operational settings of the vehicle system for the vehicle systems to operate according to the trip plan. One reason for deviating from operating according to the trip plan may include differences in vehicles. For example, the trip plan may be based on the vehicle system including ten locomotives and ten rail cars moving together along the route, however the vehicle system may include five locomotives and ten rail cars. Optionally, the trip plan may be deviated from because of changes to the route, the vehicle system desires a different time of arrival, better fuel consumption may be desired, lower emissions may need to be produced, a location and speed of other vehicle systems, the weather or environmental conditions, or the like. Optionally, manual control of the vehicle systems may be made for improved traction, improved vehicle control, or the like.

For example, the vehicle systems may operate according to the trip plan by one or more processors (e.g., onboard the vehicle systems, off-board the vehicle systems, or a combination therein). The one or more processors may operate the vehicle systems according to a trip plan that includes at least a set of instructions that includes propulsion settings and navigational settings. However, at one or more locations along the route, for one or more reasons, the vehicle systems may be operated manually (e.g., by an operator onboard and/or off-board the vehicle system). For example, the vehicle system may be operated under human control instead of a looped control system operated by one or more processors of an electronic device) irrespective of the location of the device). The vehicle system may be operated by a person rather than a set of processors. In one or more embodiments, while the vehicle system is operated by a person, the vehicle system may be referred to as being operated or controlled manually. Alternatively, while the vehicle system is operated by a controller, an electronic device, or one or more processors, the vehicle system may be referred to as being operated or controlled automatically.

Segments of the route where vehicle systems were operated manually instead of according to the trip plan may be identified. The segment of the route where the vehicle systems were operated manually may be identified during prior traversals of the segment by the vehicle systems. One or more processors of a controller may generate a segment plan based on information obtained when the vehicle systems were operated manually. For example, the segment plan may be based on how the one or more vehicle systems were manually operated during the prior traversals of the segment of the route.

As one example, the segment plan that is generated may be a machine-learned trip plan. For example, the controller may learn over time and from data obtained from at least one up to hundreds of vehicle systems how to identify locations where manual control occurred, how the vehicle systems were manually operated during the prior traversals (e.g., throttle settings, brake settings, or the like), may generate the machine-learned trip plan or segment plan, and may replace a portion of the trip plan where the vehicles were previously operated manually during the prior traversals with the new segment plan or machine-learned trip plan. For example, the controller may learn over time (e.g., learn from one vehicle system traversing the route hundreds or thousands of times, or learn from plural different vehicle systems traversing the route one time, hundreds of times, thousands of times, or the like) to identify where manual control occurred and how the vehicles were manually controlled based on information received from the vehicle systems, information received from wayside device, or the like.

The portions of the trip plan are replaced with a machine-learned trip plan based on the manual control (e.g., instead of automatic control or control by one or more processors) of the vehicle systems during the prior traversals of the segment of the route by the vehicle systems. Optionally, the machine-learned trip plan may be based on one or more rules established by an operator or user of the system. Optionally, the machine-learned trip plan may be based on information provided by a particular vehicle system, and information provided by other vehicle systems may be ignored or rejected. Optionally, the segment plan or the machine-learned trip plan may be based on prior manual control of vehicle systems over a predetermined amount of time (e.g., a number of hours, a number of days, a number of weeks, a number of years, or the like). Optionally, the machine-learned trip plan may be based on a percentage of information provided to the controller. Optionally, the machine-learned trip plan may be based on any alternative factors.

The segment plan (e.g., the updated trip plan, where the portion of the trip plan was replaced with the machine-learned trip plan) may be communicated or otherwise conveyed to vehicle systems, and the vehicle systems may be automatically controlled according to the segment plans while the vehicles traverse the segment of the route according to the segment plan. For example, the vehicle systems operating according to the segment plan may not be manually controlled within the segment of the route where prior manual control occurred. Optionally, a controller off-board the vehicle system may remotely automatically control operation of the vehicle system according to the segment plan while the vehicle system traverses the segment of the route.

While some embodiments described herein relate to rail vehicle systems, positive train control systems, and wayside devices, not all embodiments of the inventive subject matter are restricted to rail vehicles, positive train control systems, or wayside devices. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. One or more embodiments may relate to control systems that control operation of vehicles other than positive train control systems. At least one embodiment relates to sensor assemblies that are not stationary wayside devices or systems.

FIG. 1 schematically illustrates one example of a vehicle control system 100. The vehicle control system includes a vehicle system 104. that can be a rail vehicle system, but optionally can be automobiles, trucks, buses, mining vehicles, marine vessels, aircraft, agricultural vehicles, or other off-highway vehicles. The illustrated vehicle system includes a single vehicle, but optionally can be formed from two or more vehicles that may travel together (by being mechanically coupled or by being mechanically separate but communicating with each other to travel together, such as in a convoy). The vehicle system travels along a route 106, such as tracks, roads, highways, land-based paths, airborne paths, waterways, or the like.

The vehicle system 104 may also be referred to herein as a first vehicle system 104. Additionally, one or more other vehicle systems (e.g., a second vehicle system) may travel along the route at a different time than the first vehicle system. The first and second vehicle systems may be rail vehicle systems, or any other common vehicles, but optionally may be different vehicles. For example, the first vehicle system may be an automobile, and the second vehicle system may be an off-highway or agricultural vehicle that may travel along the same route.

The system 100 can include an off-board database 108. The off-board database may be disposed off-board the first vehicle system and can include a communication device 122 that communicates with first vehicle system and/or other vehicle systems. As one example, the communication device 122 may communicate with the first vehicle system and/or the second vehicle system to control or restrict movement of the vehicle systems. For example, the off-board database can communicate with the first vehicle system to notify the first vehicle system where the first vehicle system is allowed to travel, how fast the first vehicle system is allowed to travel, or the like. The communication device may include the same or similar components as other communication devices described herein.

The off-board database can include a controller 124, referred to herein as an off-board controller. The off-board controller can represent hardware circuitry that includes and/or is connected with one or more processors that perform operations of the off-board database. The off-board controller can examine communication signals received from various vehicle systems and implement one or more responsive actions. As one example, the off-board controller may issue one or more speed restrictions. The speed restrictions can be a designation of one or more segments of the route in which vehicle systems are not allowed to move faster than a designated speed limit (e.g., which is slower than the speed limit of the route and/or than the vehicle systems are capable of moving). The off-board controller can identify the location of one or more vehicle systems, route devices, wayside devices, route obstructions, or the like, based on information included in the communication signals. A memory 126 of the off-board database can store information about the vehicle systems (e.g., handling parameters of the vehicle systems, or the like), route information along which the vehicle systems move, environmental parameters, or the like.

In one embodiment, the off-board database represents a back-office server of a positive train control system. Alternatively, the off-board database represents another computerized system that communicates with vehicle systems described herein. The back-office server may communicate with the vehicle system and other vehicle systems traveling within an area associated with the back-office server. The back-office server can monitor the status of routes and/or vehicle systems in the associated area and communicate signals to the vehicle systems that prevent the vehicle systems from entering into identified segments of routes and/or allow the vehicle systems to enter into the identified segments of the routes. The back-office server can represent hardware circuitry that includes and/or is connected with one or more processors and transceiving hardware (e.g., a communication device as described herein).

The back-office server may be a positive protection system that communicates positive signals to vehicle systems. These signals can indicate that a vehicle system can enter into an upcoming segment of a route. If a controller onboard the vehicle system does not receive a positive signal from the back-office server for an upcoming segment of the route, then the controller may prevent the vehicle system from entering into the upcoming segment. For example, the controller can automatically control a propulsion system (e.g., one or more engines, motors, propellers, etc.) from propelling the vehicle system into the upcoming segment, automatically control a brake system (e.g., one or more friction brakes, air brakes, regenerative brakes, etc.) to stop the vehicle system from entering into the upcoming segment, automatically steer the vehicle system in a direction that prevents the vehicle system from entering into the upcoming segment, etc.

Alternatively, the controller of the vehicle system can prevent the vehicle system from entering into an upcoming segment unless a positive signal is received by preventing commands input by the operator of the vehicle system from controlling the propulsion system and/or brake system from moving the vehicle system into the upcoming segment (unless and/or until the positive signal is received). One example of such a positive control system is a positive train control system.

The protection system may be a negative protection system that communicates negative signals to vehicle systems. These signals are communicated to indicate that a vehicle system cannot enter into an upcoming segment of a route. If a controller onboard the vehicle system does not receive a negative signal from the back-office server for an upcoming segment of the route, then the controller allows the vehicle system to enter into the upcoming segment. The controller may only prevent the vehicle system from entering into the upcoming segment if the negative protection system sends a negative signal (indicating that the vehicle system cannot enter into the upcoming route segment).

The vehicle system may include several controllers onboard different vehicles. For example, each of two or more propulsion-generating vehicles in the vehicle system may each include a controller. A lead vehicle may include the lead controller and a trailing vehicle may include a trail controller. The trail controller can be a controller like the lead controller but disposed onboard the trailing vehicle. In one embodiment, the back-office server may communicate with one controller of the vehicle system to ensure that multiple controllers are not receiving signals from the back-office server and separately acting upon the signals. The control system may designate or identify one of the controllers as the lead controller in one embodiment. The controller designated or identified as the lead controller can be the controller that communicates with the back-office server and that controls movement of the vehicle system based on signals received from the back-office server. The designation or identification of which controller is the lead controller can change, regardless of where the controller designated or identified as the lead controller is located in the vehicle system.

Figure 2:
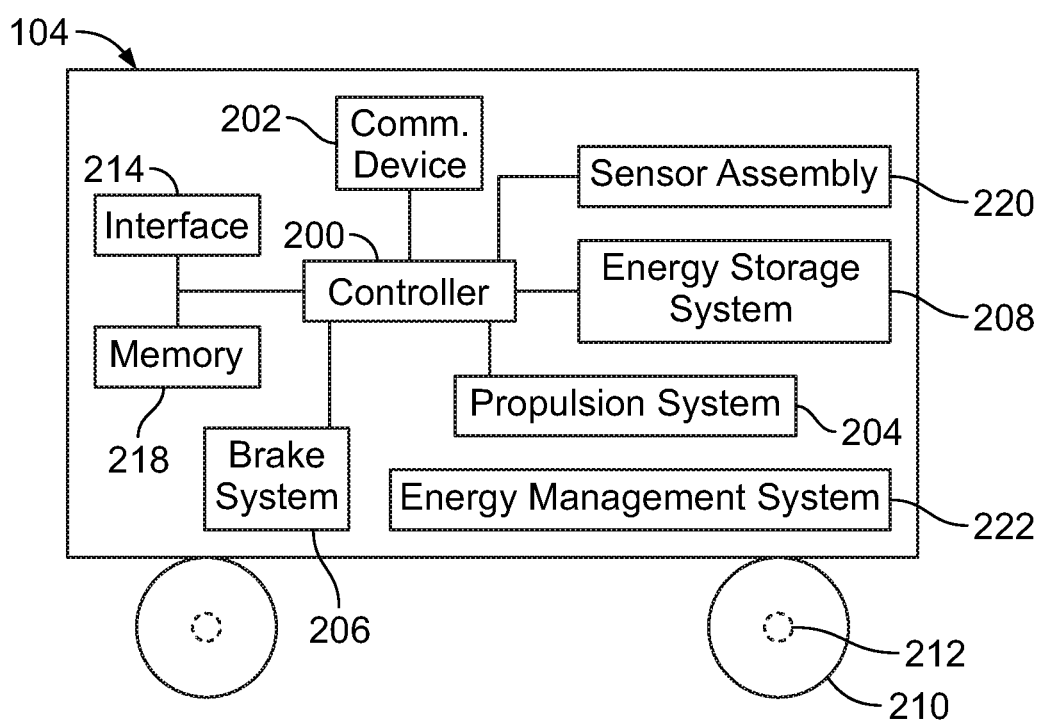
FIG. 2 schematically illustrates one example of a vehicle system.

FIG. 2 schematically illustrates one example of the first vehicle system 104 shown in FIG. 1. The vehicle system includes a controller 200, which can be referred to as the onboard controller. The onboard controller can represent hardware circuitry that includes and/or is connected with one or more processors that perform operations described in connection with the onboard controller. The onboard controller can communicate with onboard and/or off-board components via a communication device 202, which may be the same as or similar to the other communication devices described herein. For example, the communication device onboard the vehicle system may wirelessly communicate with the communication device(s) of the off-board database, a communication device of another vehicle system, and/or a communication device of another vehicle of the first vehicle system.

The vehicle system includes a propulsion system 204 that operates to move the vehicle system along the route. The propulsion system can represent one or more engines, motors, transmissions, propellers, or the like, that generate propulsion to move the vehicle system. The vehicle system also can include a brake system 206 that operates to slow or stop movement of the vehicle system. The brake system can include air brakes, friction brakes, motors (e.g., used for dynamic or regenerative braking), or the like. The onboard controller can communicate control signals with the propulsion system and/or the brake system to control or change movement of the vehicle system.

The vehicle system can include an onboard energy storage system 208 that includes one or more devices that store and/or generate electric current. This current can be used to power components onboard the vehicle system, such as the propulsion system, a lighting system, or the like. Optionally, the energy storage system can include or represent one or more motors of the propulsion system and/or the brake system (e.g., where the motors generate current during regenerative braking). The energy storage system can include one or more batteries, fuel cells, photovoltaic devices, flywheels, alternators, generators, or the like. The onboard controller can communicate control signals to the energy storage system to control supply of the current to one or more components of the vehicle system.

The vehicle system can include a sensor assembly 220 that can measure one or more characteristics of the vehicle system. The sensor assembly may include one or more sensors disposed on different vehicles of the first vehicle system that may sense, or otherwise detect characteristics of the vehicle system, characteristics of each vehicle of the vehicle system, environmental characteristics, route characteristics, or the like. In one or more embodiments, different sensors of the sensor assembly may communicate with each other, may communicate with one or more other sensor assemblies offboard the vehicle system, with the off-board database, with a second vehicle system, or the like.

The onboard controller can also control one or more settings or operations of the sensor assembly. The controller may direct different sensors of the sensor assembly to sense at one or more different times, for different lengths of time (e.g., intermittently, continuously, or the like). As one example, at least one of the sensors may be an optical sensor, and the onboard controller may control a direction the optical sensor faces and/or orientation of the optical sensor to capture images and/or video of different components of the vehicle system, different segments of the route, or the like.

The sensor assembly can include an accelerometer that measures vibrations or other movements of the vehicle system. One or more of the sensors may be a radar system that measures a time-of-flight to the vehicle system. This can be used to determine a size of the vehicle system, such as a length of the vehicle system (by identifying changes in the time-of-flight, the leading and trailing ends of the vehicle system can be identified), the number of vehicles in the vehicle system (changes in the time-of-flight can indicate passage of different vehicles), or the like. Optionally, one or more of the sensors may be a lidar system that measures changes in a structured light array. Changes in reflection of the lights in the structured light array can be used to identify the shape of the vehicle system, the size of the vehicle system, the number of vehicles in the vehicle system, or the like.

Optionally, the sensor assembly can include an audible sensor (e.g., a microphone, piezoelectric element, or the like) that senses sounds generated by movement of the vehicle system. These sounds can indicate issues or problems with the vehicle system, damage to the route and/or route device, or the like. The sensor assembly optionally can measure one or more characteristics of the route, the route device, the environment, of the like. For example, the sensor assembly can examine the route and/or route device to determine whether the route and/or route device is damaged (e.g., by injecting electric signals into conductive portions of the route to determine whether the route and/or route device is broken). The sensor assembly can measure temperatures, wind speed and/or direction, humidity, emissions in the air, or the like, of the environment outside of the vehicle system.

The onboard controller can store characteristic(s) measured by the sensor in a tangible and non-tangible computer-readable storage medium (e.g., memory), such as a computer hard drive, optical disc, server, or the like. The characteristics may be stored for later examination (e.g., accident reconstruction analysis), to identify trends or other changes in the characteristics over time, etc. Optionally, the onboard controller can examine the characteristics of the vehicle system, the route, a route device, or the like, to identify a location and/or position of the vehicle system, determine a state of the vehicle system and/or the route, determine a state of the environment, or the like. The onboard controller may generate a communication signal that can be communicated to the off-board database, to another vehicle that moves along the route (e.g., a second vehicle system), to a different off-board database, or the like.

The vehicle system may automatically move along the route according to a trip plan. The trip plan may designate different operational settings of the vehicle system at different locations along the route, different times during a trip, and/or different distances along the route. The trip plan may be created and/or modified off-board the vehicle system, such as by the off-board controller, and may be communicated to the vehicle system. Optionally, the trip plan may be created onboard the vehicle system by an energy management system 222 of the vehicle system. The energy management system may represent hardware circuitry that includes and/or is connected with one or more processors (e.g., one or more microprocessors, field programmable gate arrays, integrated circuits, or the like) that create and/or modify trip plans.

In one or more embodiments, the energy management system may determine the trip plan by examining previous trips of the same or other vehicles or vehicle systems (e.g., consists of plural vehicles), the vehicle characteristics, the route characteristics, and/or other characteristics to determine the operational settings of the vehicle system at different locations along one or more routes, at different distances along the one or more routes, and/or at different times for a trip that optimize fuel consumption and/or emission generation (e.g., relative to the vehicle traveling on the one or more routes for the trip at an upper speed limit or route speed). The trip plan may be communicated to the onboard controller (e.g., from the off-board database and/or from the energy management system), and the controller may automatically generate and communicate control signals to the propulsion system and/or brake system. These control signals may automatically control movement of the vehicle system to follow the operational settings of the trip plan. Optionally, the control signals may be communicated to the operator to instruct the operator how to manually, semi-automatically, or the like, control the movement of the vehicle system according to the trip plan.

Figure 3:
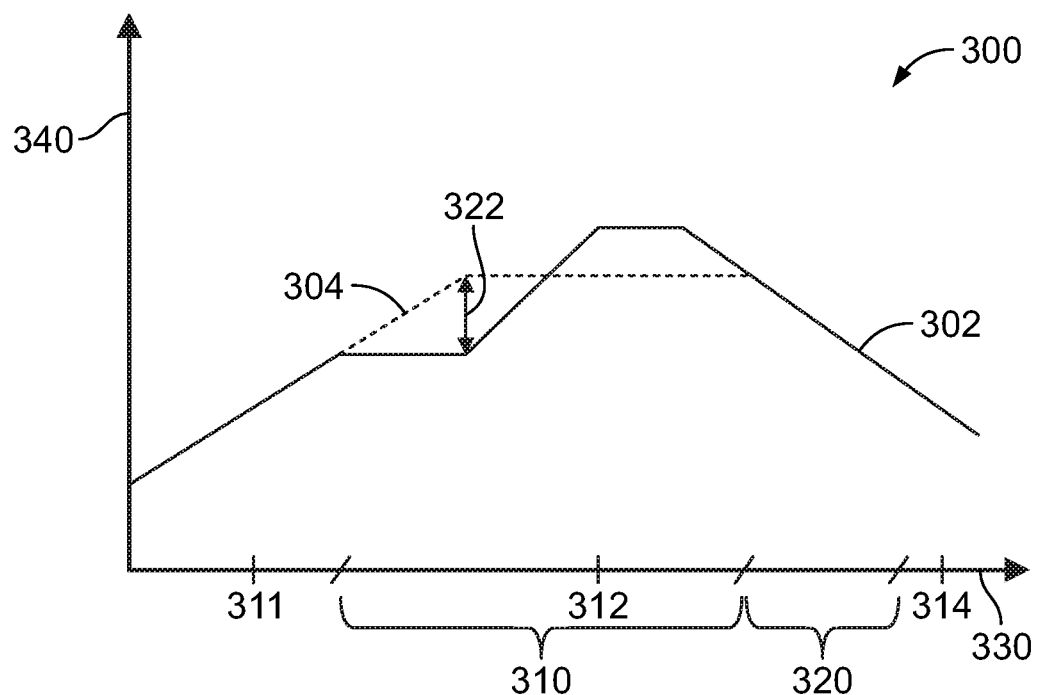
FIG. 3 schematically illustrates a graph of one example of a trip plan.

FIG. 3 illustrates a graph 300 of one example of a trip plan. The graph is for illustrative purposes only and illustrates one example of automatically operating the vehicle system according to the trip plan. A horizontal axis 330 indicates the route, and a vertical axis 340 represents an operating speed of the vehicle system. The first vehicle system moves along the route according to the trip plan as indicated by a line 302. For example, as the first vehicle system moves along the route (e.g., at increasing distances along the horizontal axis), the speed of the first vehicle system increases then remains substantially constant, increases again, remains substantially constant, and then decreases. For example, at a point 311 (e.g., a first location along the route), the first vehicle system may have a first throttle setting, at a point 312 (e.g., a second location along the route) the first vehicle system may have a different second throttle setting and/or a brake setting, and at a point 314 (e.g., a third location along the route) the first vehicle system may a different third throttle setting and/or different third brake setting. The trip plan designates the different operational settings of the first vehicle system so that the first vehicle system automatically moves along the route according to the trip plan.

However, at one or more segments along the route, the first vehicle system may be unable to move along the route according to the trip plan and an operator may need to manually control operation of the first vehicle system. As one example, the segment may have a speed limit that is not considered by the trip plan, and handling the first vehicle system according to the trip plan may violate a designated limit. The speed of the first vehicle system may need to change so that the first vehicle system moves according to the speed limit or does not violate the designated speed limit. As another example, the first vehicle system may be moving in an area that has an increase amount of congestion or traffic, and the speed of the first vehicle system may need to be reduced to move through the segment. As another example, the first vehicle system may be carrying an amount of cargo, or a type of cargo, that may prohibit the first vehicle system from operating at the designated speed of the trip plan. Optionally, operation of the first vehicle system may not be automatically controlled according to the trip plan and may be manually controlled (e.g., by an operator onboard the vehicle system, by an operator off-board the vehicle system, or the like) for any alternative reason.

A segment 310 of the graph may be identified and may indicate one example where automatic control of the first vehicle system was overridden and the first vehicle system was operated under manual control as indicated by a line 304. The segment may represent a portion of the route along which the first vehicle system may move according to manual control of the first vehicle system.

Figure 4:
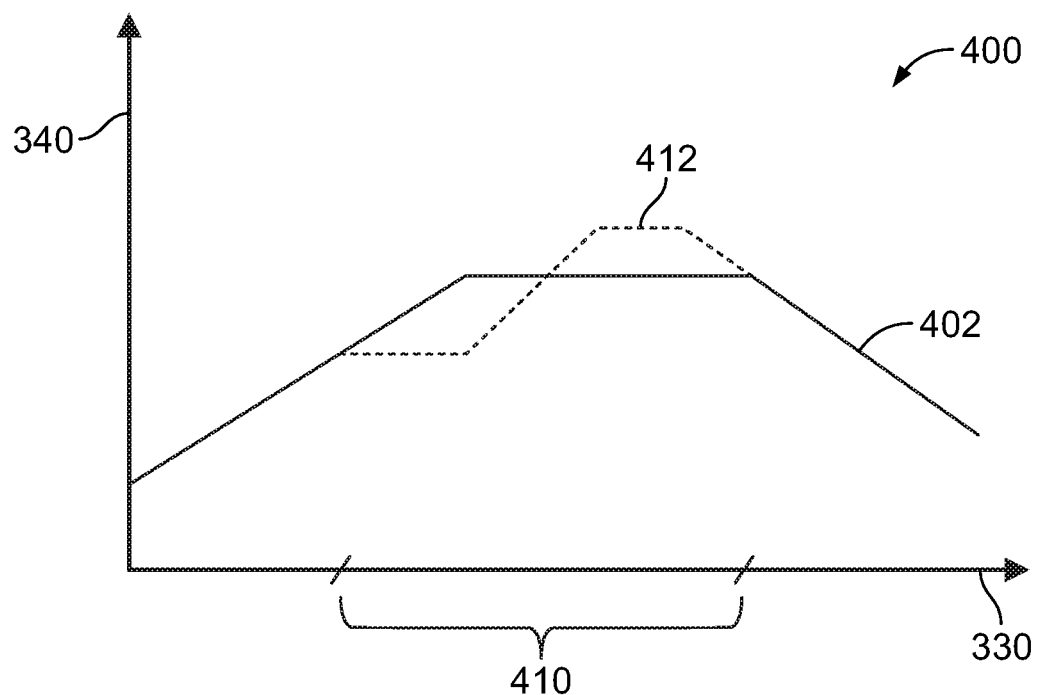
FIG. 4 schematically illustrates a graph of one example of a segment plan.

As one example for improving the trip plan for a subsequent second vehicle system to traverse the segment of the route, a portion of the trip plan may be replaced with a segment plan for traversing the segment of the route under control of one or more processors (e.g., instead of manual control by a person). The segment plan may be generated based on how the first vehicle system was manually operated during the prior traversals of the segment of the route. For example, FIG. 4 illustrates a graph 400 of one example of a modified trip plan. The segment 310 where the first vehicle systems were operated manually instead of operated by one or more processors according to the trip plan during prior traversals of the segment of the route by the first vehicle systems is replaced with a segment plan 410. For example, a portion of the original trip plan where the first vehicle systems were operated manually instead of operated by the one or more processors is replaced with the segment plan 410. The segment plan 410 is generated (e.g., by the off-board controller, by the onboard controller, or the like) based on how the first vehicle system was manually operated as the first vehicle system previously moved along the route within the segment of the route. For example, the segment plan 410 may be based on the throttle settings of the first vehicle system, brake settings of the first vehicle system, or the like.

As one example, a second vehicle system may move along the route according to the segment plan, such that the second vehicle system may be controlled by one or more processors (e.g., instead of manually) within the segment 410, where the first vehicle system was manually controlled within the segment 310. For example, the second vehicle system may be automatically controlled to move along the route according to the segment plan as indicated by a line 402. As illustrated in FIG. 4, the segment 310 representing a portion of the original trip plan and demonstrating where device control of the first vehicle system was overridden, was replaced by the new segment plan. The second vehicle system may be controlled by one or more processors (e.g., of a controller, an electronic device, or the like) according to the segment plan as the second vehicle system traverses the segment 410 according to the segment plan. For example, a line 412 indicates the original trip plan for how the first vehicle system was to move under automatic control but was instead operated manually. A difference 322 between the original trip plan and the segment plan indicates how the first vehicle system was supposed to be automatically controlled but was instead manually operated.

In one or more embodiments, the first vehicle system may have violated a designated speed limit as the first vehicle system moved within the segment 310. One or more processors of the off-board controller, the energy management system, the onboard controller, or the like, may identify the segment of the route where the first vehicle system was operated according to manual control instead of automatic control according to the trip plan during the prior traversals of the segment of the route. The portion of the trip plan corresponding to the segment of the route may be replaced by the segment plan, and other vehicle systems may be automatically controlled according to the segment plan while the other vehicle systems traverse the segment of the route.

The segment plan may be machined-learned based on how the first vehicle system and/or other vehicle systems were previously operated while the first vehicle systems previously traversed the segment of the route. For example, the off-board database may be a smart or an intelligent system such that the off-board database may use machine learning to analyze and learn from the segments of the route where the first vehicle system and/or other vehicle system operated according to manual control instead of automatically controlled according to the trip plan. For example, the off-board controller may repeatedly identify locations where manual control is detected and locations where manual control is not detected. Information input into the off-board controller (e.g., by an operator or route personnel) may confirm or refute whether manual control occurred at one or more of these locations. Based on the accuracy or inaccuracy of the off-board controller in identifying where manual control occurred and where the off-board controller accurately and/or inaccurately identified manual control of vehicle systems, the off-board controller can learn over time how to better identify locations where manual control occurred. Additionally, the off-board controller can modify trip plans based on the off-board controller learning where manual control occurred and where manual control did not occur, to replace segments of a trip plan where vehicle systems were manually controlled. For example, the off-board database may change or modify the trip plan in order to generate the segment plan based on information the off-board controller learned about the manual-control segments of the route. Alternatively, the off-board controller may use one or more other techniques to determine if vehicle systems were operated under manual control instead or automatic control according to the trip plan along any segments or portions of the route.

The off-board database may communicate the segment plan (e.g., the machine-learned trip plan) to the second vehicle system. The segment plan includes one or more operating parameters (e.g., brake setting, throttle setting, or the like) of the second vehicle system. The second vehicle system may be automatically controlled according to the segment plan while the second vehicle system is moving within the segment of the route. For example, the second vehicle system may not need to be manually operated within any segment of the route corresponding to the segment plan.

Operating the second vehicle system according to the segment plan may prevent the second vehicle system from violating a designated limit. In one or more embodiments, the designated limit may be an emissions limit, a speed limit, a noise restriction, a wake restriction, The second vehicle system may receive the segment plan from the off-board database as a bulletin, movement authority, or a movement schedule for the second vehicle system. Optionally, the second vehicle system may receive the segment plan from the first vehicle system. Additionally or alternatively, the first vehicle system may receive the segment plan while the first vehicle system is moving within the portion of the route, and the first vehicle system may move according to the segment plan while the first vehicle system moves within the portion of the route. For example, the first vehicle system may change from operating under manual control to operating under automatic control according to the segment plan while the first vehicle system moves within the segment of the route.

In one example, the onboard controller can be an onboard computer that is used in a positive train control system. The first vehicle system optionally can communicate a signal with the off-board database, such as a back-office server of the positive train control system. The signal may include the manually controlled handling parameters of the first vehicle system such as throttle settings and/or brake settings (e.g., instead of automatically controlled according to the trip plan), a location or portion of the route where the first vehicle system was manually controlled, a time stamp indicating when the first vehicle system was manually controlled, environmental conditions, or the like. The first vehicle system may communicate the signal while the first vehicle system is being operated manually (e.g., simultaneously, or substantially simultaneously). Optionally, the signal may be communicated after the first vehicle system has returned to being automatically controlled, after the first vehicle system traveled a predetermined distance along the route, after the first vehicle system reached a predetermined milestone (e.g., a predetermined mile marker), after the first vehicle system completed travel of the route, or the like. This server can use the signal to generate the segment plan for other vehicle systems to be automatically controlled while the other vehicle systems traverse the segment of the route. Optionally, the server may automatically control one or more operational settings of the first vehicle system (e.g., a brake setting and/or a throttle setting), to modify the trip plan and generate the segment plan, to communicate the segment plan to the first vehicle system, the second vehicle system, or another vehicle system, to alert an operator onboard the first and/or second vehicle systems, to direct the operator onboard the first and/or second vehicle systems to manually change one or more operational settings of the first and/or second vehicle systems, or the like.

Returning to FIG. 3, in one or more embodiments, the segment 310 may be a first segment of the trip plan where automatic control of the first vehicle system was overridden and the first vehicle system was operated manually during prior traversals of the segment of the route. The off-board database, the energy management system, the onboard controller, or the like, may also identify a second segment 320 of the trip plan where automatic control of the first vehicle system was not overridden. The segment plan may be generated such that a first segment plan may replace the first segment 310 of the trip plan, and the second segment 320 of the trip plan may not be replaced, such that the second vehicle system may move within the second segment 320 according to the original trip plan.

Optionally, the off-board database, the energy management system, the onboard controller, or the like, may identify a second segment (not shown) of the trip plan where automatic control of the first vehicle system was overridden and the first vehicle system was operated under manual control in the first segment of the route, and the first vehicle system was also operated under manual control in the second segment. As one example, prior movement of the first vehicle system within the first segment cause handling of the first vehicle system to violate a first designated limit, and prior movement of the first vehicle system within the second segment caused handling of the first vehicle system to violate a second designated limit. The one or more processors may generate the segment plan that may place the first segment and the second segment of the trip plan with the segment plan. The second vehicle system may be automatically controlled according to the segment plan as the second vehicle system traverses the route.

In one or more embodiments, the off-board database may determine a difference between one or more operating settings of the first vehicle system that was previously operated under manual control and one or more operating settings of the segment plan. For example, the off-board database may determine a difference 322 between the trip plan as indicated by the line 302 and the line 304 indicating one or more operating parameters of the first vehicle system while the first vehicle system was operated under manual control. The difference 322 may represent different operating or handling parameters of the first vehicle system (e.g., different throttle settings, brake settings, speeds, or the like). The off-board database may determine the segment plan based on the differences between the operating settings under prior manual control and the operating settings under automatic control of the vehicle systems.

Figure 5:
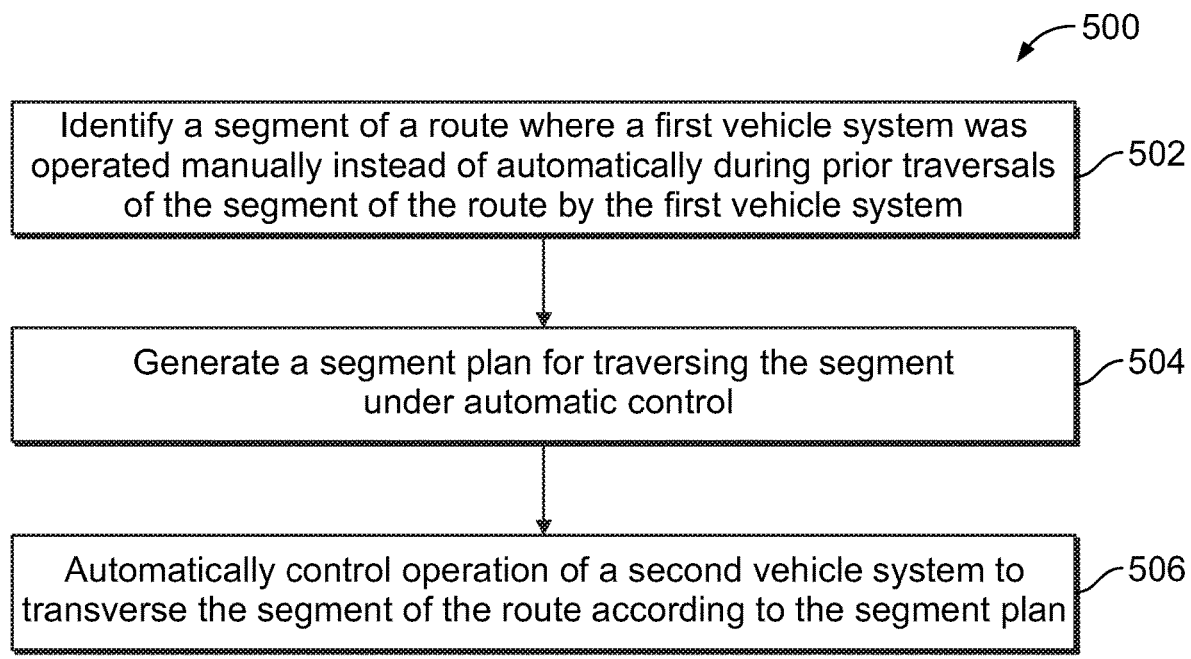
FIG. 5 illustrates a flowchart of one example of a method for controlling operation of a vehicle system.

FIG. 5 illustrates a flowchart of one example of a method 500 for controlling operation of a vehicle system. One or more first vehicle systems may have previously moved along a route under automatic control of the first vehicle systems according to a trip plan. The trip plan may designate different operational settings of the first vehicle systems at different locations along the route, different times during a trip, and/or different distances along the route. The trip plan may be created and/or modified off-board the first vehicle system, such as by the off-board controller, and may be communicated to the first vehicle systems. Optionally, the trip plan may be created onboard the first vehicle system by an energy management system of the vehicle system. The trip plan may be communicated to the controller of the first vehicle system (e.g., from the off-board database and/or from the energy management system), and the controller may automatically generate and communicate control signals to the propulsion system and/or brake system. These control signals may automatically control movement of the vehicle system to follow the operational settings of the trip plan.

At 502, a segment of a route where automatic control of the first vehicle systems is and/or was overridden and the first vehicle systems were operated under manual control is identified. In one or more embodiments, the segment of the route may represent a portion of the route along which the first vehicle system and other vehicle systems may move. The first vehicle systems may have overridden the segment of the trip plan to operate the first vehicle system under manual control for plural different reasons. As one example, operating under automatic control may have caused the first vehicle system to violate a designated limit, such as a speed limit, emissions limit, noise limit, or the like. As another example, operating under automatic control may be dangerous for the first vehicle systems. For example, environmental conditions (e.g., snow, fog, rain, or the like), may reduce a visibility of the operator of the first vehicle system, debris may be disposed on and/or alongside the route, the route may be damaged, or the like. As another example, the trip plan may be based on the first vehicle systems carrying an amount of cargo, and the first vehicle systems may actually be carrying or may have carried a different amount of cargo, a different kind of cargo, or the like. As another example, the trip plan may be based on obsolete or outdated information. For example, the trip plan may designate a location along the route as a rural area, but the location may be an industrial area, or the like. Optionally, the first vehicle systems may have overridden the segment of the trip plan for any alternative reason.

At 504, the segment of the route that was overridden by the first vehicle system is replaced with a segment plan. The segment plan may be generated based on how the one or more first vehicle systems were manually operated during the prior traversals of the segment of the route. For example, one or more processors of the controller of the off-board database may receive signals from the one or more first vehicle systems identifying the segment where the trip plan was overridden, a reason why the trip plan was overridden, a time stamp indicating when the trip plan was overridden, the manual control handling parameters of the first vehicle system (e.g., throttle setting, brake setting, or the like), or the like. The controller of the off-board database may study, analyze, review, or the like, the information provided by the first vehicle system related to the segment of the trip plan where automatic control of the first vehicle system was overridden by the first vehicle system and operation of the first vehicle system was manually controlled.

In one or more embodiments, the off-board database may collect information from the one or more first vehicle systems representative of the segment of the trip plan. For example, two or more different vehicle systems may have traveled along the route according to the trip plan (e.g., under automatic control), and different vehicle systems may have overridden the trip plan for one or more different reasons, may have manually controlled operation according to one or more different operating parameters, may have overridden at different times of day, different times of year, or the like. The off-board database may collect plural signals from plural different first vehicle systems related to a same or common segment of the trip plan, a same or common portion of the route, or the like, that relates to the prior traversals of the segment of the route by the plural different first vehicle systems.

The off-board database may learn from the data collected from the first vehicle system and any other vehicle systems over time to determine and generate a segment plan. The segment plan may be based on prior manual control by the one or more first vehicle systems and other vehicle systems as the first vehicle systems previously traversed the segment of the trip plan or portion of the route. As one example, the segment plan may be a machine-learned trip plan that may be an extraction of best practices of the data collected, may be generated based on operating rules or handling regulations of the vehicle systems, or the like.

In one or more embodiments, the off-board database may learn from the data collected from vehicle systems over time based on rules that may be established by an operator or user of the system. As one example, the rules may direct the off-board database to analyze data related to one or more specific portions of the route (e.g., between mile A and mile B, within a predetermined distance away from a target location, or the like). As another example, the rules may direct the off-board database to analyze data based on a length of time one or more of the vehicle systems were operated under manual control (e.g., for a predetermined distance, for a predetermined length of time, or the like). As another example, the rules may direct the off-board database to analyze the data based on a differential between prior handling parameters while under automatic control and prior handling parameters while under manual control. For example, the trip plan may designate a throttle setting of 5 while a vehicle system moves within a segment of the route. However, the vehicle system may have been manually controlled within the segment of the route and may have been operated at a throttle setting of 2 (e.g., is slower than the vehicle system operated under automatic control), and a predetermined differential may be 1×, such that the off-board database may identify the segment of the route where the manual control of the vehicle system is outside of the predetermined differential. Alternatively, the predetermined differential may be 5×, and the portion of the route where the vehicle system that was manually operated at the throttle setting of 2 instead of the automatic throttle setting of 5 may not be identified.

In one or more embodiments, the segment plan may be generated based on data or information related to how a single first vehicle system was operated or controlled as the first vehicle system traversed the route. Alternatively, the segment plan may be generated based on information from hundreds of data points. For example, the segment plan may be based on one vehicle system traversing the route one time, hundreds of times, thousands of times, or the like. Optionally, the segment plan may be based on plural different vehicle systems, each of which traversing the route one time, hundreds of times, thousands of times, or the like. In one or more embodiments, the segment plan may be based on information corresponding to the type of vehicle systems that previously traversed the route. For example, the controller may separate information based on a number of different vehicles making up the vehicle consist, based on environmental conditions, based on timing (e.g., time of day, time of year, or the like), based on a type of cargo the vehicle systems may be carrying, or the like.

The off-board database may communicate the segment plan with one or more second vehicle systems, the first vehicle system, or any other vehicle systems that may travel along the route. In one or more embodiments, the off-board database may communicate an alert or message to the operator of the second vehicle systems that the trip plan or a portion of the trip plan has been replaced by the segment plan. Alternatively, the off-board database may not communicate an alert or a message to the operator of the second vehicle systems.

At 506, the one or more second vehicle systems are automatically controlled according to the segment plan while the one or more second vehicle systems traverse the segment of the route according to the segment plan. For example, automatically operating the second vehicle systems according to the segment plan enables the second vehicle systems to move along the segment of the trip plan (e.g., the portion of the route) without manually controlling operation of the second vehicle system.

In one or more embodiments of the subject matter described herein, a method includes identifying a segment of a route where one or more first vehicle systems were operated manually instead of operated by one or more processors according to one or more trip plans during prior traversals of the segment by the one or more first vehicle systems. A segment plan is generated for traversing the segment under control of the one or more processors. The segment plan is generated based on how the one or more first vehicle systems were manually operated during the prior traversals of the segment. One or more second vehicle systems are controlled with the one or more processors to traverse the segment according to the segment plan.

Optionally, the method may include determining that the prior traversals of the segment by the one or more first vehicle systems caused handling of the one or more first vehicle systems to violate a designated limit.

Optionally, the method may include controlling the on or more second vehicle systems according to the segment plan to prevent the one or more second vehicle systems from violating the designated limit.

Optionally, the designated limit may be one or more handling parameters of the one or more first vehicle systems.

Optionally, the segment plan may be a machine-learned trip plan. A portion of the one or more trip plans where the one or more first vehicle systems were operated manually instead of operated by the one or more processors may be replaced with the machine-learned trip plan.

Optionally, the machine-learned trip plan may be received from an off-board database.

Optionally, the one or more trip plans may include one or more trip plan operating parameters. The segment plan may include one or more segment operating parameters of the one or more second vehicle systems that are different than the one or more trip plan operating parameters.

Optionally, the method may include controlling the one or more second vehicle systems according to the segment plan while the one or more second vehicle systems are moving within the segment of the route.

Optionally, the segment of the route may be a first segment of the route. A second segment of the route where the one or more first vehicle systems were operated by the one or more processors according to the one or more trip plans during prior traversals of the second segment of the route may be identified. The one or more second vehicle systems may be controlled according to the trip plan while the one or more second vehicle systems move within the second segment of the route.

Optionally, the segment of the route may be a first segment of the route where the one or more first vehicle systems were operated manually instead of operated by the one or more processors according to the one or more trip plans. A second segment of the route where the one or more first vehicle systems were operated manually instead of operated by the one or more processors according to the one or more trip plans during prior traversals of the second segment by the one or more first vehicle systems may be identified. A second segment plan for traversing the second segment under control by the one or more processors may be generated.

Optionally, the method may include determining that prior movement of the one or more first vehicle systems through the first segment of the route caused handling of the one or more first vehicle systems to violate a first designated limit, and determining that prior movement of the one or more first vehicle systems through the second segment of the route caused handling of the one or more first vehicle systems to violate a second designated limit.

Optionally, the method may include determining a difference between one or more operating settings of the one or more first vehicle systems operated manually instead of operated by the one or more processors and one or more operating settings of the one or more second vehicle systems according to the segment plan.

In one or more embodiments of the subject matter described herein, a vehicle control system includes a controller that identifies a segment of a route where one or more first vehicle systems were operated manually instead of operated by one or more processors according to one or more trip plans during prior traversals of the segment by the one or more first vehicle systems. The controller generates a segment plan for traversing the segment under control of the one or more processors. The segment plan may be generated based on how the one or more first vehicle systems were manually operated during the prior traversals of the segment. The controller controls one or more second vehicle systems to traverse the segment according to the segment plan.

Optionally, the controlled may determine that prior traversals of the segment by the one or more first vehicle systems caused handling of the one or more first vehicle systems to violate a designated limit.

Optionally, the controller may control the one or more second vehicle systems according to the segment plan to prevent the one or more second vehicle systems from violating the designated limit.

Optionally, the designated limit may be one or more handling parameters of the one or more first vehicle systems.

Optionally, the segment plan may be a machine-learned trip plan. The controller may replace a portion of the one or more trip plans where the one or more first vehicle systems were operated manually instead of operated by the one or more processors with the machine-learned trip plan.

Optionally, the controller may receive the machine-learned trip plan from an off-board database.

Optionally, the one or more trip plans may include one or more trip plan operating parameters. The segment plan may include one or more segment operating parameters of the one or more second vehicle systems that are different than the one or more trip plan operating parameters.

In one or more embodiments of the subject matter described herein, a method includes identifying a segment of a route where one or more first vehicle systems were operated manually instead of operated by one or more processors onboard the one or more first vehicle systems according to one or more trip plans during prior traversals of the segment by the one or more first vehicle systems. A machine-learned trip plan is generated for traversing the segment under control of the one or more processors. The machine-learned trip plan may be generated based on how the one or more first vehicle systems were manually operated during the prior traversals of the segment. A portion of the one or more trip plans where the one or more first vehicle systems were operated manually instead of operated by the one or more processors is replaced with the machine-learned trip plan. The one or more second vehicle systems are controlled with the one or more processors onboard the one or more second vehicle systems to traverse the segment according to the machine-learned trip plan.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    identifying a segment of a route where one or more first vehicle systems were operated manually instead of operated by one or more processors according to one or more trip plans during prior traversals of the segment by the one or more first vehicle systems;
    generating a machine-learned trip plan for traversing the segment under control of the one or more processors, the machine-learned trip plan being generated based on how the one or more first vehicle systems were manually operated during the prior traversals of the segment; and
    controlling one or more second vehicle systems with the one or more processors to traverse the segment according to the machine-learned trip plan.

2. The method of claim 1, further comprising determining that the prior traversals of the segment by the one or more first vehicle systems caused handling of the one or more first vehicle systems to violate a designated limit.

3. The method of claim 2, further comprising controlling the one or more second vehicle systems according to the machine-learned trip plan to prevent the one or more second vehicle systems from violating the designated limit.

4. The method of claim 2, wherein the designated limit is one or more handling parameters of the one or more first vehicle systems.

5. The method of claim 1, further comprising replacing a portion of the one or more trip plans where the one or more first vehicle systems were operated manually instead of operated by the one or more processors with the machine-learned trip plan.

6. The method of claim 1, further comprising receiving the machine-learned trip plan from an off-board database.

7. The method of claim 1, wherein the one or more trip plans include one or more trip plan operating parameters, wherein the machine-learned trip plan includes one or more segment operating parameters of the one or more second vehicle systems that are different than the one or more trip plan operating parameters.

8. The method of claim 1, further comprising controlling the one or more second vehicle systems according to the machine-learned trip plan while the one or more second vehicle systems are moving within the segment of the route.

9. The method of claim 1, wherein the segment of the route is a first segment of the route, further comprising identifying a second segment of the route where the one or more first vehicle systems were operated by the one or more processors according to the one or more trip plans during prior traversals of the second segment of the route, and controlling the one or more second vehicle systems according to the trip plan while the one or more second vehicle systems move within the second segment of the route.

10. The method of claim 1, wherein the segment of the route is a first segment of the route where the one or more first vehicle systems were operated manually instead of operated by the one or more processors according to the one or more trip plans, further comprising identifying a second segment of the route where the one or more first vehicle systems were operated manually instead of operated by the one or more processors according to the one or more trip plans during prior traversals of the second segment by the one or more first vehicle systems, and generating a second machine-learned trip plan for traversing the second segment under control by the one or more processors.

11. The method of claim 10, further comprising determining that prior movement of the one or more first vehicle systems through the first segment of the route caused handling of the one or more first vehicle systems to violate a first designated limit, and determining that prior movement of the one or more first vehicle systems through the second segment of the route caused handling of the one or more first vehicle systems to violate a second designated limit.

12. The method of claim 1, further comprising determining a difference between one or more operating settings of the one or more first vehicle systems operated manually instead of operated by the one or more processors and one or more operating settings of the one or more second vehicle systems according to the machine-learned trip plan.

13. A vehicle control system comprising:
a controller configured to identify a segment of a route where one or more first vehicle systems were operated manually instead of operated by one or more processors according to one or more trip plans during prior traversals of the segment by the one or more first vehicle systems,
wherein the controller is configured to generate a machine-learned trip plan for traversing the segment under control of the one or more processors, the machine-learned trip plan being generated based on how the one or more first vehicle systems were manually operated during the prior traversals of the segment, and
wherein the controller is configured to control one or more second vehicle systems to traverse the segment according to the machine-learned trip plan.

14. The vehicle control system of claim 13, wherein the controller is configured to determine that the prior traversals of the segment by the one or more first vehicle systems caused handling of the one or more first vehicle systems to violate a designated limit.

15. The vehicle control system of claim 14, wherein the controller is configured to control the one or more second vehicle systems according to the machine-learned trip plan to prevent the one or more second vehicle systems from violating the designated limit.

16. The vehicle control system of claim 14, wherein the designated limit is one or more handling parameters of the one or more first vehicle systems.

17. The vehicle control system of claim 13, wherein the controller is configured to replace a portion of the one or more trip plans where the one or more first vehicle systems were operated manually instead of operated by the one or more processors with the machine-learned trip plan.

18. The vehicle control system of claim 13, wherein the controller is configured to receive the machine-learned trip plan from an off-board database.

19. The vehicle control system of claim 13, wherein the one or more trip plans include one or more trip plan operating parameters, wherein the machine-learned trip plan includes one or more segment operating parameters of the one or more second vehicle systems that are different than the one or more trip plan operating parameters.

20. A method comprising:
identifying a segment of a route where one or more first vehicle systems were operated manually instead of operated by one or more processors onboard the one or more first vehicle systems according to one or more trip plans during prior traversals of the segment by the one or more first vehicle systems;
generating a machine-learned trip plan for traversing the segment under control of the one or more processors, the machine-learned trip plan being generated based on how the one or more first vehicle systems were manually operated during the prior traversals of the segment;
replacing a portion of the one or more trip plans where the one or more first vehicle systems were operated manually instead of operated by the one or more processors with the machine-learned trip plan; and
controlling one or more second vehicle systems with one or more processors onboard the one or more second vehicle systems to traverse the segment according to the machine-learned trip plan.

* * * * *